Nov. 24, 1953  E. R. OLSEN  2,660,494
PISTON RING
Filed Oct. 4, 1951  3 Sheets-Sheet 1
Fig. 1.
Fig. 2.
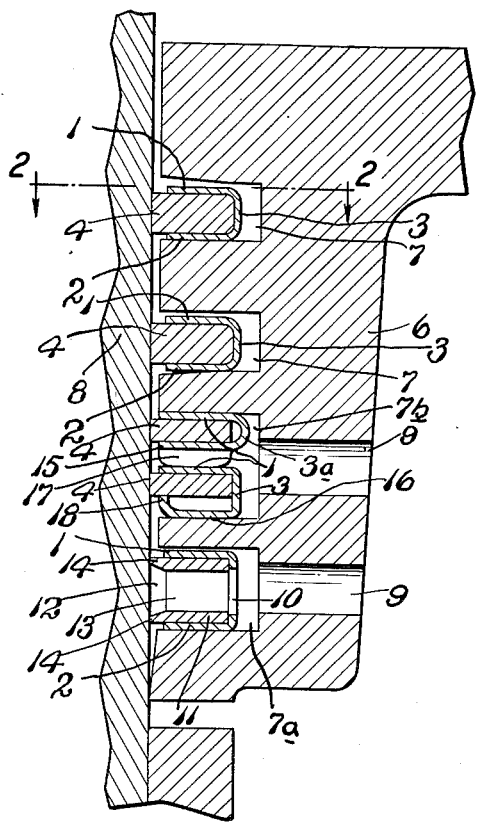
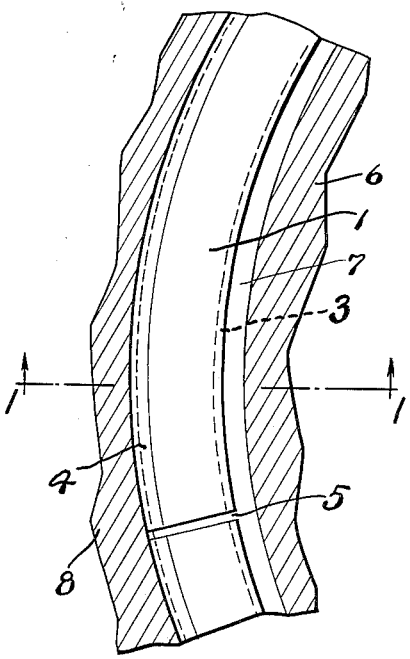
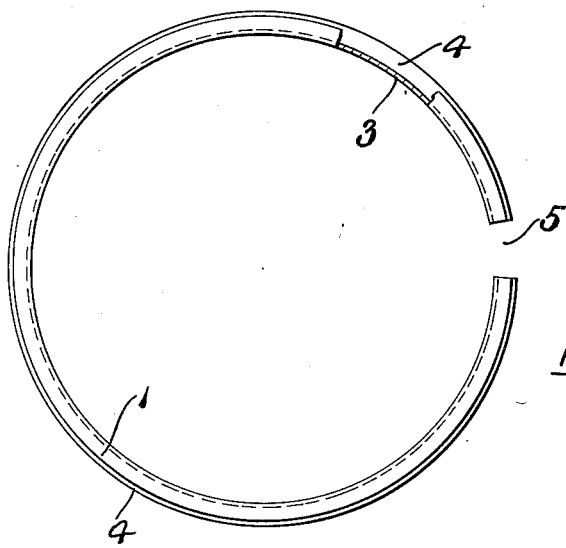
Fig. 4.
Fig. 3.
INVENTOR.
Ernest R. Olsen
-BY-
Frank E. Liverance, Jr.
Attorney Nov. 24, 1953  E. R. OLSEN  2,660,494
PISTON RING
Filed Oct. 4, 1951  3 Sheets-Sheet 2
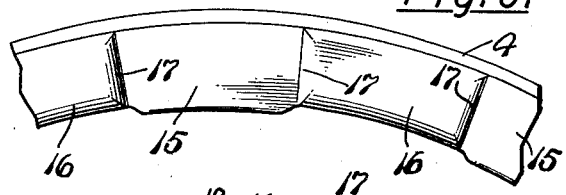
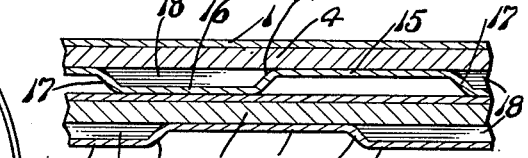
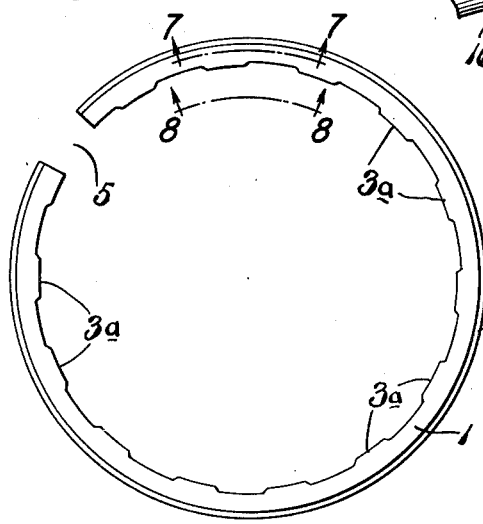
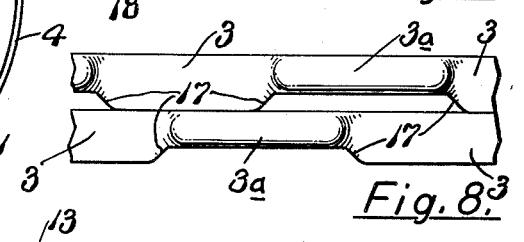
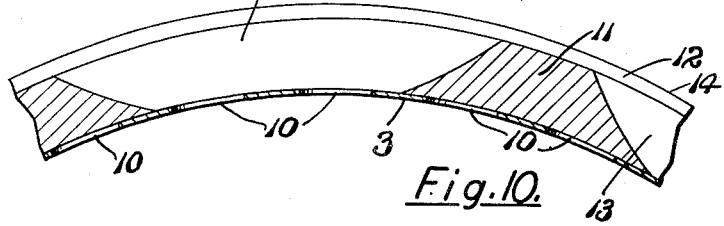
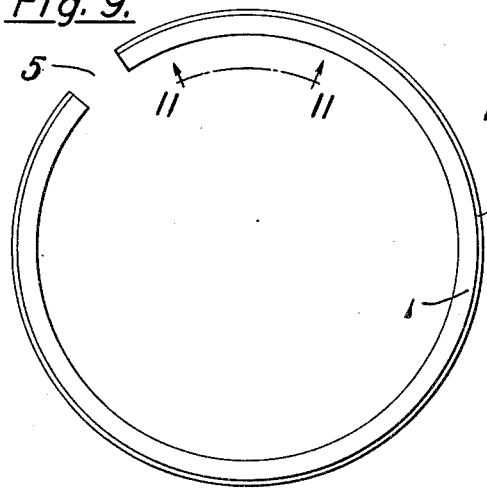
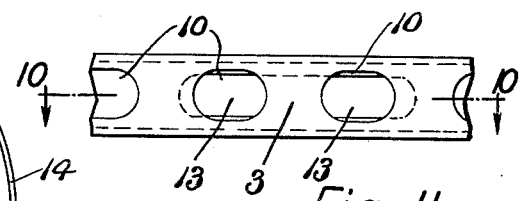
INVENTOR.
Ernest R. Olsen
BY
Frank E. Liverance, Jr.
Attorney

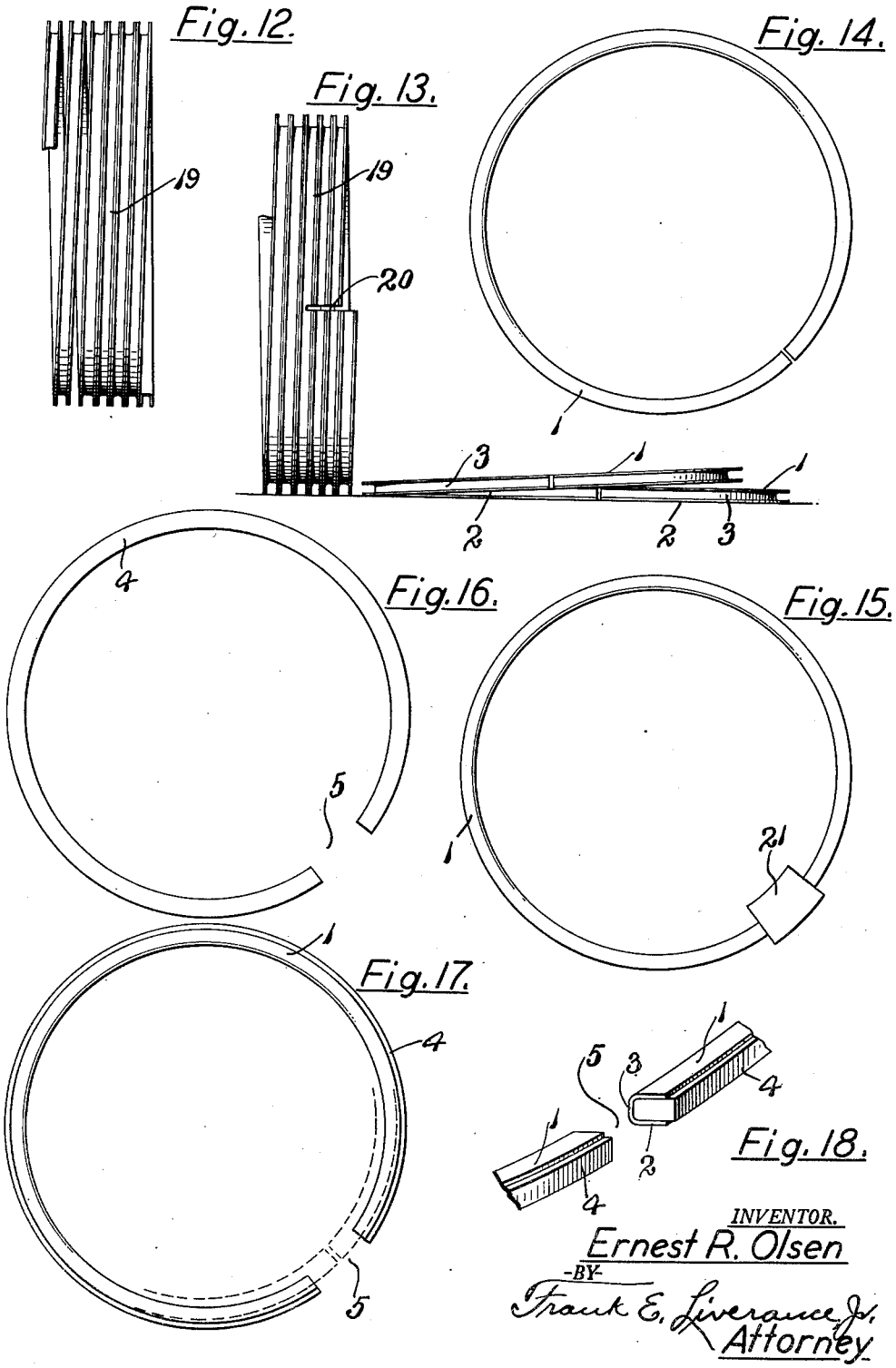

Patented Nov. 24, 1953

2,660,494

UNITED STATES PATENT OFFICE 2,660,494

PISTON RING

Ernest R. Olsen, Muskegon, Mich.

Application October 4, 1951, Serial No. 249,682

4 Claims. (Cl. 309—29)

This invention relates to a very practical piston ring structure, used in internal combustion engines for effectively sealing against the passage of oil, from the crankcase upward past the piston, to the combustion chamber above the piston, or of gases, either of the fuel mixture or combustion, from the combustion chamber downwardly to the engine crankcase.

The increasing speeds of operation of engines, increasing rotative speeds of the engine crankshafts and of movement of reciprocating pistons, has required from time to time the discarding of an older type of piston ring for a better one which, in turn, because of continuously increasing speeds of engine operation require discarding and replacement. The oil on the inner walls of a cylinder required for lubrication must be substantially cut through and not ridden over by piston rings, otherwise there will be excessive use of oil, smoky exhaust and deterioration of engine operation through the production of carbon from burned oil. This requires narrowing the faces of the piston rings which bear with pressure against the cylinder walls. Such narrowing of the piston rings decreases their strength, and such rings have had their pressure against the cylinder walls increased by spring expanders back of the rings, bearing at spaced distances in their lengths against the inner curved sides of the rings, and also at spaced points, alternating with the points where the expanders bear against the rings, against the bottoms of the ring grooves. This cures the defect of lack of tension in the rings, and lack of unit pressure thereof against the cylinder walls, but at the higher speeds of the engines renders the action of the rings sluggish, while at idling speeds of the engine or other speeds relatively low, causes the rings to bear harshly against the cylinder walls with resultant scuffing or other damage.

Many attempts have been made to substitute for cast iron as the material from which piston rings in internal combustion engines has been substantially universally made, using steel, or by alloying cast iron with other metallic substances, such iron alloys being of greater tensile strength than the usual cast iron but without much success. The bearing of steel against cast iron, except in very narrow widths has proven unsuccessful, while in the iron alloys obtaining satisfactory castings of piston rings is difficult, the alloys frequently having very hard spots or points of iron carbide which are destructive of machine tools used in finishing the rings, and the rings are easily broken and are otherwise not satisfactory.

The elimination of the expander spring back of piston rings is very desirable, and one object of my invention is such elimination. The freedom of movement of piston rings is restored with my invention. A bearing surface of cast iron of narrow width of the piston ring with cast iron to cast iron in piston ring against the engine cylinder wall is obtained, yet the unit pressure of the bearing surface of the piston ring against the cylinder wall is not diminished but may be increased to any desired amount. The piston ring is responsive to the varying surfaces of the inner walls of cylinders against which it bears, and is not sluggish, which sluggishness permits excess passage of oil and all of the disadvantages which come from excess oil consumption.

Moreover my invention is applicable to piston rings used in all of the piston ring grooves of a piston in an internal combustion engine, as compression rings in the upper grooves, the oil, wiping and conserving rings in the lowermost grooves of pistons, and in the grooves next to the lowermost grooves, composite rings with oil passages for oil to be returned from the cylinder walls to the interior of the piston and thence to the engine crankcase, which composite rings are freely and independently movable with respect to each other rotatively about the pistons, thereby insuring against the collection of carbon. Such independent action to meet varying diameters of tapered cylinder bores is not present in inner spring rings. Carbon deposits in oil vented rings progressively increases, the closer they are located to the high temperature to which the upper ends of pistons are subjected. The piston ring of my invention accomplishes the objects and purposes stated in a very simple, practical and economical manner, any desired degree of unit pressure of the outer faces of the rings or the lands thereof against the engine cylinder walls being obtainable, with a complete elimination of auxiliary expander rings for higher pressure, as now used.

An understanding of the invention may be had from the following description taken in connection with the accompaying drawings, in which, Fig. 1 is a fragmentary enlarged vertical section through a cylinder wall and a piston therewithin, showing different forms of piston rings embodying my invention for upper compression and lower oil saving and conserving rings.

Fig. 2 is a fragmentary horizontal section on the plane of line 2—2 of Fig. 1, looking downwardly.

Fig. 3 is a plan view of a compression ring made in accordance with my invention, a part of the housing channel for the cast iron ring member being broken out.

Fig. 4 is a fragmentary perspective view enlarged, of an end portion of a compression ring made in accordance with my invention.

Fig. 5 is a plan view of a piston ring, made in accordance with my invention, for use in a ring groove immediately below the compression rings to provide a double ring within said groove, vented for oil passage.

Fig. 6 is a fragmentary under plan view of a section of the ring shown in Fig. 5.

Fig. 7 is a fragmentary vertical section substantially on the plane of line 7—7 of Fig. 5, looking in the direction indicated.

Fig. 8 is a fragmentary enlarged elevation of a portion of the ring at the inner side thereof, in the zone indicated by the line 8—8 of Fig. 5.

Fig. 9 is a plan view of a piston ring made in accordance with my invention, used in the lowermost ring groove of a piston for wiping oil from a cylinder wall and passing it through the ring, for conserving oil.

Fig. 10 is a fragmentary horizontal section, enlarged, through a portion of the ring, the section being taken on the plane of line 10—10 of Fig. 11.

Fig. 11 is an enlarged elevation of the inner side of the ring, at the zone indicated by the line 11—11 in Fig. 9.

Fig. 12 is an elevation of a continuously coiled channel of steel material provided in the first step of producing rings of my invention.

Fig. 13 is a like elevation, illustrating the second step of producing said outer housing channels by sawing the coil parallel to its axis at one side, to make individual channel-shaped steel housing or retainers for the cast iron members of the rings.

Fig. 14 is a plan view of one of the ring channels produced, in which the ends of the channel are separated by the width of the saw used in Fig. 13.

Fig. 15 is a plan view, showing the channel of Fig. 14 opened at its end and held in open position by a block or segment which changes the ring channel from a substantially circular form, as in Fig. 14, to an even radial pressure out-of-round form, at which it is tempered to retain said form when the segment is removed.

Fig. 16 is a plan view after such tempering with the segment removed.

Fig. 17 shows the completed ring in full lines, the channel housing member having the cast iron ring or other ring of suitable material therein, the ring being contracted and the opening or gap between the ends of the ring closed as when used within a cylinder, and Fig. 18 is a fragmentary enlarged perspective view of the end portions of the ring at the opening or gap therein.

Like reference characters refer to like parts in the different figures of the drawings.

The ring of my invention includes an inner ring member of substantially channel cross section of tempered low carbon steel, having an upper horizontal flange 1, a lower horizontal flange 2 parallel to the upper flange, said flanges being integrally connected by a web 3 between the inner edge portions of said flanges. Within this channel housing or retainer, a ring member 4 of cast iron is placed of a width, horizontally, that when its inner curved edge bears against the web 3, its outer edge or cylinder engaging face projects beyond the free edges of the upper and lower flanges 1 and 2. The ring is parted at one side, at 5 in Fig. 3, and is of an out-of-round form designed to effect an even radial wall pressure at all points of the periphery when in close contact with the cylinder wall, so that when installed within an engine cylinder in the groove of a piston 6 and contracted to substantially close the opening or gap at 5, the ring takes a substantially true even radial wall pressure designed form with the outer curved face of the cast iron ring members 4 against the wall of the cylinder 8. Such rings as described are used in the upper ring grooves 7 toward the upper end of the piston 6.

The channel retainer or housing for the cast iron ring member 4 is of a suitable grade of steel, capable of being heat treated to make it into a spring which resists the contraction of the ring to close the gap 5, in addition to the resistance of the cast iron ring member 4. The channel member of thin steel and of the channel cross section shown provides ample resistance to the closure of the ring so that the cast iron ring member 4, which alone is not sufficiently resistant to such closure, will have added to it the resistance of the retaining member or holder which carries it, a tension which will produce any required unit pressure and even radial wall pressure of the cast iron ring member 4 against the cylinder wall. The degree of temperature to which the steel channel member is raised and the manner in which it is cooled after raising to such selected temperature, plus the amount of gap opening and thickness of steel used, governs the unit pressure of the ring against the cylinder wall.

For an oil wiping ring, as shown in the lowermost groove 7a of the piston, which lower groove from its bottom has oil passages 9 from the ring groove to the interior of the piston, the steel channel housing is of generally the same form as that shown for compression rings in the upper groove 7 except, the groove 7a being of greater width than the grooves 7, the web of the channel is longer than with the compression rings. Such web 3 of the channel has a plurality of oil passing openings 10 made through it. The cast iron member 11 of the ring, at its outer side, is machined to make a shallow, continuous annular groove 12. From the bottom of such groove 12 through the ring, slots 13 are cut by punching, as indicated in Fig. 11. The groove 12 is of less width than the vertical or axial dimension of the ring 11, leaving upper and lower lands 14 which bear against the cylinder walls as shown in Fig. 1.

In the groove above the lowermost groove 7a, next below the lowermost compression ring groove 7, an oil removing and conserving ring having two identical ring members is to be installed. The inserted cast iron or steel segment ring members 4 are similar to the ring members 4 of the compression rings, but of lesser thickness. The channel housing members for the members 4 have upper flat horizontal flanges 1 but, different from the compression rings, the webs 3 are greater in length than the thickness of the cast iron ring members 4, the lower flanges of said channels at their free edge portions being bent upwardly into lips at 18. Said lower flanges of the channels are deformed by a press operation to provide short lengths 15, which are against the lower sides of the cast iron ring members 4, alternating with other short horizontal lengths or sections 16, spaced from the lower sides of the ring members 4, with the alternate sections 15 and 16 integrally connected by short angular portions 17 as shown in Fig. 7, the lips 18 extending upwardly from the sections 16 to the lower sides of the ring members 4.

Preferably two of the rings thus made are located in the groove 7b, which may be wider than any of the other ring grooves. The upper flange 1 is against or very closely spaced from the upper side of the ring groove. The under portions of the steel retaining housing at their horizontal sections 16 ride upon the upper flange 1 of the lower ring member as shown in Figs. 1 and 7. The sections 16 of the lower ring of the double ring installed in the groove 7b ride upon the lower side of the ring groove 7b. Both of the complete rings, two being shown as used to fill the groove 7b, are independent in turning and flexing movements thereof about the vertical axis of the piston. It is evident that with the rings described located in the groove 7b, ample passage is provided for oil gathered by the piston ring and passing therethrough to the bottom of the groove 7b, from which it returns through the passages 9 used with the groove, the same as with the groove 7a for returning of oil thus saved to the engine crankcase.

The cast iron ring or steel segment members are produced by the methods now used to manufacture conventional rings. This is by making either individual castings or twin castings which are sawed across to make two individual ring castings, the circular designed radial pressure pattern for the ring castings being parted at one side and a segment introduced at the parting of a desired length so that the ring castings are of out-of-round form. In finishing the rings there is removed from each casting where such parting segment was placed in the pattern, a length of the ring casting corresponding to the length of the segment used. The cast iron ring member is finished by grinding and other machine operations in the usual manner. Other conventional methods include integral shaped, grooved dies or templates, or peening or die shaping, getting equivalent ring gaps.

The thin steel used is of a low carbon content, approximating .10%. It is readily rolled into channel cross section and into a continuous coil as shown at 19 in Fig. 12. Such coil is separated at one side in a direction parallel to the longitudinal axis of the coil as at 20 in Fig. 13, making the individual channel retainers or housings having upper and lower flanges 1 and 2 and connecting webs 3, each of the ring housings being parted at a side as shown. Such parting may be accomplished in any suitable preferred manner.

The channel ring member housings are then heated to a relatively high degree of temperature which, in practice, may be betwen 1,000 and 1,500 degrees Fahrenheit, and then cooled giving the housing members a relatively high temper, resisting separation of the parted rings at the partings therein. Such tempered housing members are separated at the cut which has been made, and blocks or other separators, at 21, placed between the ends of the channel member to hold them separated. The channels can be mounted upon a bar of predetermined shape, with a spacer bar mounted thereon and means to hold the rings against the bar to keep same in contact with the bar during the drawing operation to maintain the rings to the shape and design of the internal bar during heat treatment. Thus separated, the temper is drawn by heating and a retempering is done at approximately 750 degrees Fahrenheit. After heating to the approximate 750 degrees Fahrenheit, or any other temperature selected, the cooling is by air cooling which gives a channel member in practice, approximately the desired resistance of closing such channel at the parting 5, the channel housing member being held mechanically in contact with the shaped internal bar and spacer bar in order to maintain required shape during the second tempering operation.

The cast iron ring member 4 or steel segment member is easily placed within its channel holder, it having a parting at one side of a length equal to the parting in the channel holder or retainer. On contraction of the complete ring to close the parting, there is obtained the added resistances to closure of both the cast iron member 4 and the steel housing or carrier therefor.

As shown and described, my invention may be utilized in making not only compression rings, but various types of oil rings. In all of the types of rings, the desired narrowness of bearing faces of rings against a cylinder wall is attained, and required unit pressure of the rings against a cylinder wall is obtained without corrugated spring expanders back of the ring which bear at spaced intervals against the inner sides of the rings and at other spaces, alternating with those where the expanders bear against the rings, against the bottoms of the ring grooves. The sluggishness or damping of action of piston rings caused by movement of the many contact points of spring expanders is entirely eliminated. The ring in any of its types has freedom of movement both radially and laterally, its outer bearing face freely following the changing diameter of the tapered cylinder wall in a free flexing movement and not lagging through frictional drag as when ring expanders are used.

The projection of the cast iron ring member beyond the outer edges of the channel carrier or holder therefor provides iron to iron contact which is desirable, particularly during the initial operations of an engine, known as breaking in. And when such outer projecting portion of the cast iron member has worn until the face is flush with the outer edges of the steel channel member, the ring is usable, the graphite content of the cast iron providing sufficient protection of the cylinder walls from the steel flanges of the channel housing retainer, so that the cylinder walls are not scuffed, scored or otherwise injured.

The degree or amount of tension in a ring when closed at its parting may be controlled by the thickness of the steel used, the amount of gap opening and the extent to which it is tempered. The piston ring made in accordance with my invention also is of a sturdy nature, the cast iron member being protected by the steel carrier therefor, so that it is safeguarded from breakage which, in the small cross section which it has, would frequently occur if alone without the protecting housing therefor.

It is to be understood that the double ring in the groove 7b of the piston 6 may, in some cases, be replaced by a single ring of the same structure in a narrower groove. In either case, the freedom of movement of such ring rotatively about the piston, which freedom of movement is snubbed and checked if a spring expander is used, insures against the vents or passages for oil being wholly or partially closed by carbon accumulation. Moreover, the absence of the spring expander ring with its ventilating openings or passages therein removes an additional member which is subject to carbon deposits, wholly or partially closing the piston groove oil passage vents. The increasing speeds of operation of internal combustion engines which, as first stated, has successively obsoleted piston rings which were successful at lower speeds, is taken care of by the free flexing action of the ring of my invention in a completely satisfactory manner.

The invention is defined in the appended claims and is to be considered comprehensive of all forms of structure coming within their scope.

I claim:

1. A piston ring comprising, a narrow cast iron ring member, parted at one side and of rectangular cross section, and a housing carrier for said ring member of thin tempered steel, said carrier also having a parting at one side and having spaced sides located one at one side of the cast iron ring member and one at the other side thereof, and an integral web connecting said sides located at the inner curved side of said cast iron ring member, said ring member and carrier therefor when free being normally of an even radial wall pressure design of out-of-round form and when closed at the parting being of an even radial wall pressure shape, both said ring member and carrier therefor yieldingly resisting closure at the parting, and the outer curved bearing face of the cast iron ring member being a short distance outwardly of the adjacent free edges of the spaced side of the carrier.

2. A structure as defined in claim 1, said carrier having a plurality of spaced oil passage openings through it from its outer to its inner curved side, and the web of said carrier member having oil passage openings therethrough.

3. A piston ring comprising, a parted ring member of cast iron, the ends of the ring member at the parting being normally spaced from each other and when the ring member is closed at the parting, said member being of substantially circular form, a carrier of thin tempered steel for said ring member of generally channel cross section, between the spaced sides of which the ring member is located, with the connecting web of the channel between the sides of said carrier at the inner curved side of the ring member, said carrier being parted at one side and normally having the ends thereof spaced from each other, said carrier being of generally channel shape in cross section, one flange of the carrier member lying against a side of the ring member and the other having alternate spaced sections, every other one of which sections lies against the opposite side of the ring member, and the alternate sections between being spaced a short distance outwardly therefrom, the web integrally connecting the spaced sides of said carrier being located at the inner curved edge of the ring member.

4. A piston ring comprising, a narrow ring element of ferrous material having parting means whereby the ring member may be opened to pass over a piston for installation in a ring groove thereof, and a housing carrier for said ring member of thin tempered steel, said carrier having a parting at one side and having spaced sides located one at each side of the ring member and an integral web connecting said sides located at the inner curved side of said ring member, said ring member and carrier therefor, when free, being of an even radial wall pressure design of out-of-round form and, when closed, being of an even radial wall pressure shape, both said ring element and carrier therefor yieldingly resisting contraction and closure at the parting, the outer curved edges of the sides of said carrier member being a short distance inwardly of the adjacent free edges of said ring member within the carrier member.

ERNEST R. OLSEN.

References Cited in the file of this patent

UNITED STATES PATENTS

| Number | Name | Date |
|---|---|---|
| 2,317,580 | Bauer | Apr. 27, 1943 |
| 2,330,550 | Bowers | Sept. 28, 1943 |

FOREIGN PATENTS

| Number | Country | Date |
|---|---|---|
| 650,241 | Germany | Sept. 14, 1937 |
| 475,698 | Great Britain | Nov. 24, 1937 |
| 400,091 | Italy | Nov. 24, 1942 |